March 31, 1936.                H. E. BORGER                2,036,014
                               PRINTING SCALE
                        Filed Feb. 28, 1931         3 Sheets-Sheet 3

FIG. 3.

INVENTOR
H. E. Borger
BY his ATTORNEY

Patented Mar. 31, 1936

2,036,014

UNITED STATES PATENT OFFICE 2,036,014

PRINTING SCALE

Henry E. Borger, Dayton, Ohio, assignor, by mesne assignments, to International Business Machines Corporation, New York, N. Y., a corporation of New York Application February 28, 1931, Serial No. 519,042

7 Claims. (Cl. 265—5)

This case relates to weighing scales, particularly of the recording type.

The object of the invention is to provide novel means for sensing the load on the scale and controlling recording mechanism accordingly.

Further, the object is to provide novel means mechanically separate from any part of the weighing mechanism and controlled by the latter for controlling the recording mechanism.

Still further, the object is to provide light sensitive means for reading the position of the scale mechanism.

More specifically, an object is to provide a photoelectric cell device including means for amplifying the current controlled thereby for sensing the position of the scale mechanism.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 3 is a circuit diagram of the machine.

Figure 1:
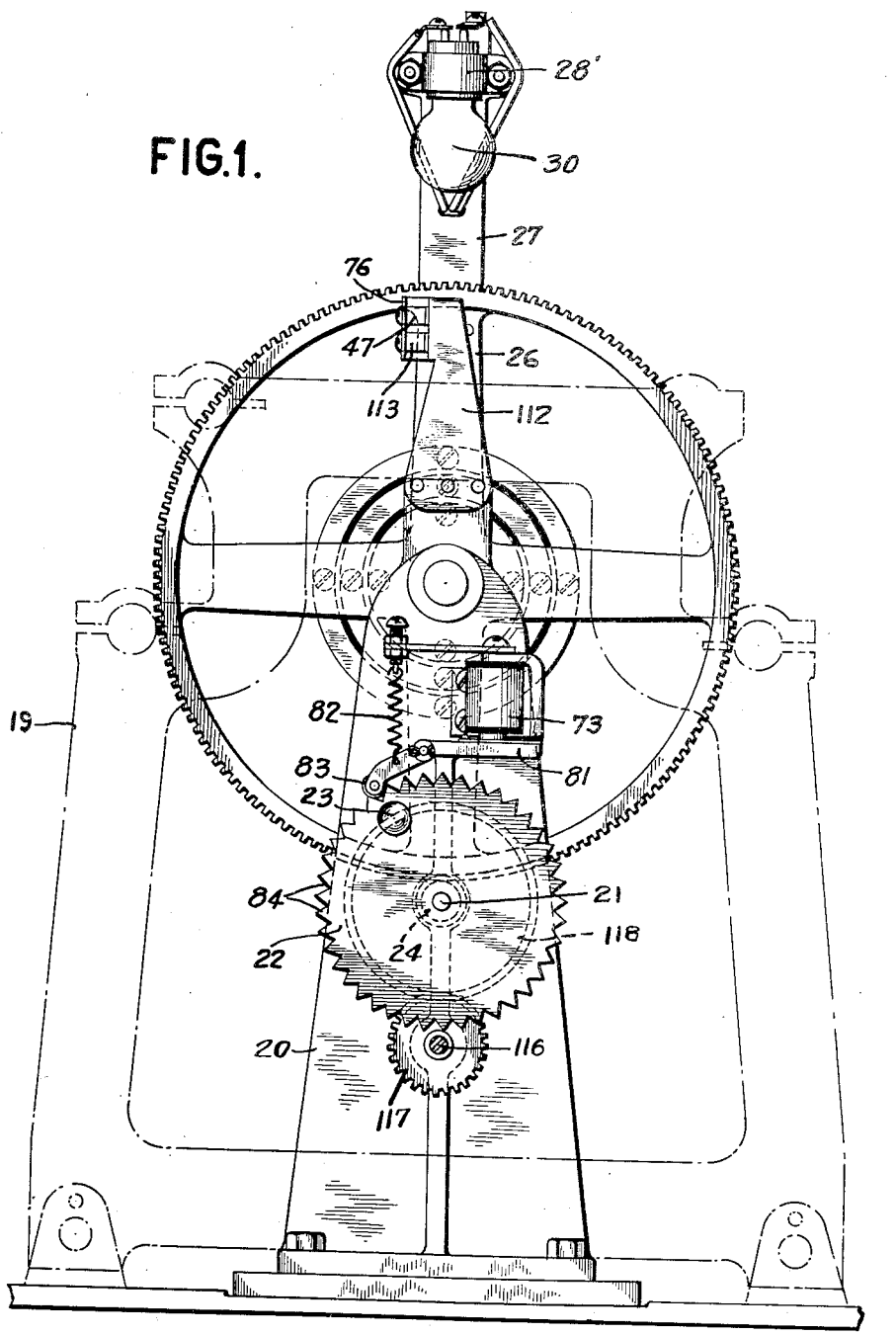
Fig. 1 is a rear view of the sensing and recording section of the machine.

The invention may be applied to any well-known type of scale but for purposes of illustration it has been applied to the scale shown in Patent 1,777,873 issued to J. W. Bryce.

In further detail, the load support (not shown) is eventually connected to the tape 10 which is secured to the power sections 11 of the pendulums 12 and to an intermediate member 13 which is provided with a rack 14 meshed with the pinion 15 on the indicator shaft 16 for operating pointer 17. Fast to the end of the shaft 16 opposite the end to which the pointer is secured is an arm 18 of opaque light-weight material such as aluminum or black-coated celluloid.

The above mentioned parts are carried by a frame 19. To this frame is secured the auxiliary frame or standard 20 for carrying the load sensing and recording mechanism. In this standard is journalled a shaft 21 one end of which carries a notched wheel 22 to which is attached a crank handle 23. The other end of the shaft 21 carries a small gear 24 meshed with a large gear 25, an appreciably large reduction in motion being obtained between gears 24 and 25.

One of the spokes 26 of gear 25 has fast therewith an arm 27 carrying at its outer end a pair of sockets 28 and 28' one on each side of arm 27. One of these sockets 28 holds a light bulb 29 and the other 28' holds the photoelectric cell 30 which serves as an electrical eye. The portion of arm 27 extending between the bulb 29 and cell 30 has an opening 31 through which light rays from bulb 29 pass to the cell 30 and energize the latter. The photoelectric cell possesses the characteristic when placed in the dark of increasing its resistance to passage of a current therethrough. When energized by a beam of light, the cell lowers its resistance to the passage of the current.

The manner in which this characteristic of the photo cell is utilized in the instant case may be explained with reference to the circuit diagram, Fig. 3. The filament of bulb 29 is lighted by a circuit established from the minus side of battery P through line 35, brush 36, conductive ring 37 engaged therewith, terminal screw 38, line 39 and the minus terminal post 40 of the base 41 of the light bulb. From the plus terminal post of the base of the light bulb, the circuit returns through line 42, terminal screw 43, conductive ring 44, brush 45, line 46, spring blade 47, contact stud 48 thereon, coacting stud 48 on blade 49, and line 50 to the plus side of battery P. Contacts 48 are held open when gear 25 is in home position but permitted to close as soon as the gear is moved away from home position, as will be further explained hereinafter.

Photo cell 30 may be considered as a variable resistance for controlling the negative bias on the grid 51 of vacuum tube 52. This negative bias is placed on the grid by connecting the minus terminal of a battery C through a resistance 53 to a lead 54 going to the grid. A positive bias is placed on the photo cell element by lead 50 from the plus side of battery P connected through contacts 48, brush 45, ring 44, and lead 42, to one post 55 of the base of the photo cell. From the other post 56 of said base, a lead 57 goes to terminal screw 58 of slip ring 59, brush 60, and leads 61 and 54 to the grid. Resistance 53 reduces the flow from the negative side of battery C to the photo cell element to a negligible amount thereby preventing an arc forming inside the cell which would ruin it.

Since the grid is under the negative bias of battery C and the positive bias of battery P acting through the photo cell, it does not appreciably influence flow of electrons in the vacuum tube from the filament 63 to the plate 64. However, when the light from bulb 29 to the photo cell is interrupted, the resistance of the latter will increase considerably and the positive bias on the grid 51 correspondingly reduced. The negative bias on grid 51 is thereby greatly increased. The grid being between the filament and plate the flow of electrons from filament 63 to plate 64 will thereby be decreased. The potential built up on the plate by battery P which flows through lead 65, through magnet 66, lead 67, contacts 68, lead 69, lead 46, and contacts 48 to the plus side of battery P is now of magnitude insufficient to effect energization of magnet 66. The latter thereupon releases armature 71 spring 172 thereupon closing contacts 72 and closing the circuit through a magnet 73. This circuit is established from the plus side of battery A through lead 74 to contacts 75 carried by spring blades 76, line 77, magnet 73, line 78, contacts 72, controlled by magnet 66, line 79, and push button switch 80, to the minus side of battery A. When magnet 66 is deenergized, spring 172 operates to close contacts 72 as above explained, the circuit through magnet 73 is closed and (see Fig. 1) armature lever 81 is rocked counterclockwise against action of spring 82 moving a roller 83 at its free end into the nearest notch 84 on the ratchet stop wheel 22 fast to shaft 21. The notches in wheel 22 are spaced to correspond to movement of the sensing device from pound to pound. Thus, the wheel 22 is alined by the roller 83 with the nearest pound graduation on the scale dial.

The filament 63 of the vacuum tube 52 is lighted by current from the A battery, the circuit being from plus side of this battery through line 74, contacts 75, line 86, filament 63, and rheostat 87 to the minus side of battery A.

In order to prevent operation of magnets 66 of the sensing and recording devices until the scale pointer comes to rest under a load, the intermediate lever 90 of the scale operates the plunger 91 of the main dash pot 92 which has passages 93 to an auxiliary dash pot 94. The flat disk 95 in the latter is connected through rod 96 to a bell lever 97 having at its upper end a spring strip 98 provided with opposed contact studs 99 movable between opposite contacts 100. The springs 101 normally hold the contacts 99 centrally between and apart from both contacts 100. When a load is placed on the scale, a surge or vibration is set up in both dash pots to which disk 95 and spring strip 98 are very sensitive. As the strip 98 vibrates, contacts 99 and 100 rapidly make thereby completing a circuit through a solenoid 102 from the plus side of battery A through line 74, contacts 75, lines 86 and 103, contacts 99 and 100, strip 98, lever 97, line 104, solenoid 102, and line 105 to the minus side of battery A. Solenoid 102 upon energization, moves the armature core 106 thereof upwardly, the lower end of which is located in an air dash pot 107 and the upper end of which has a pin 108 normally holding contact blade 109 down to cause engagement of contacts 68. When core 106 moves up, the pin 108 releases blade 109, permitting contacts 68 to open. While contacts 68 are open, the previously traced circuit through magnet 66 cannot be established. When the scale pointer comes to rest, lever 97 and strip 98 stop vibrating, contacts 99 and 100 open and solenoid 102 is deenergized. Core 106 then descends gradually under control of the air dash pot 107 and pin 108 finally closes contacts 68. The circuit through magnet 66 may now be established from the plus side of battery P to cause the magnet to open contacts 72.

Push button contacts 80 are opened after a weighing and recording operation to deenergize magnet 73 and release wheel 22 for movement.

The operation of the weighing, sensing and recording apparatus is as follows: A load placed on the scale rotates pointer 17 and arm 18 together. The operator now through crank handle 23 and wheel 22 rotates shaft 21. Gear 24 thereon drives gear wheel 25. To this wheel is fast an arm 112 (Fig. 1), the upper end of which when wheel 25 is in home position engages insulator blocks 113 fixed to the upper blades 47 and 76 respectively of contacts 48 and 75 as seen in Fig. 3. In home position, the blades 47 and 76 are held away from the coacting blades by the engagement of arm 112. Contacts 48 and 75 will thus normally be held open and the circuits through bulbs 29 and 30 will be open prior to operation of the sensing and recording device. As soon as the wheel 25 is moved clockwise (as viewed in Fig. 1) the contacts 48 and 75 close and the previously traced circuits are simultaneously established through lamp 29, cell 30, and plate 64. Cell 30 being energized, the circuit through relay magnet 66 is established and therefore latch control magnet 73 is also deenergized. This will continue until wheel 25 brings the lamp 29 and cell 30 into radial alinement with the tip of pointer arm 18. When this occurs, the beam to the photo cell is blocked by the pointer and the photo cell is deenergized. Relay magnet 66 is thereupon deenergized provided the pointer arm 18 has come to rest which condition will be sensed by the operating means for equilibrium sensing contacts 68 in the circuit of magnet 66. Assuming equilibrium had been reached, magnet 73 will be energized and wheel 22 and the gears operated thereby latched by armature 81.

Figure 2:
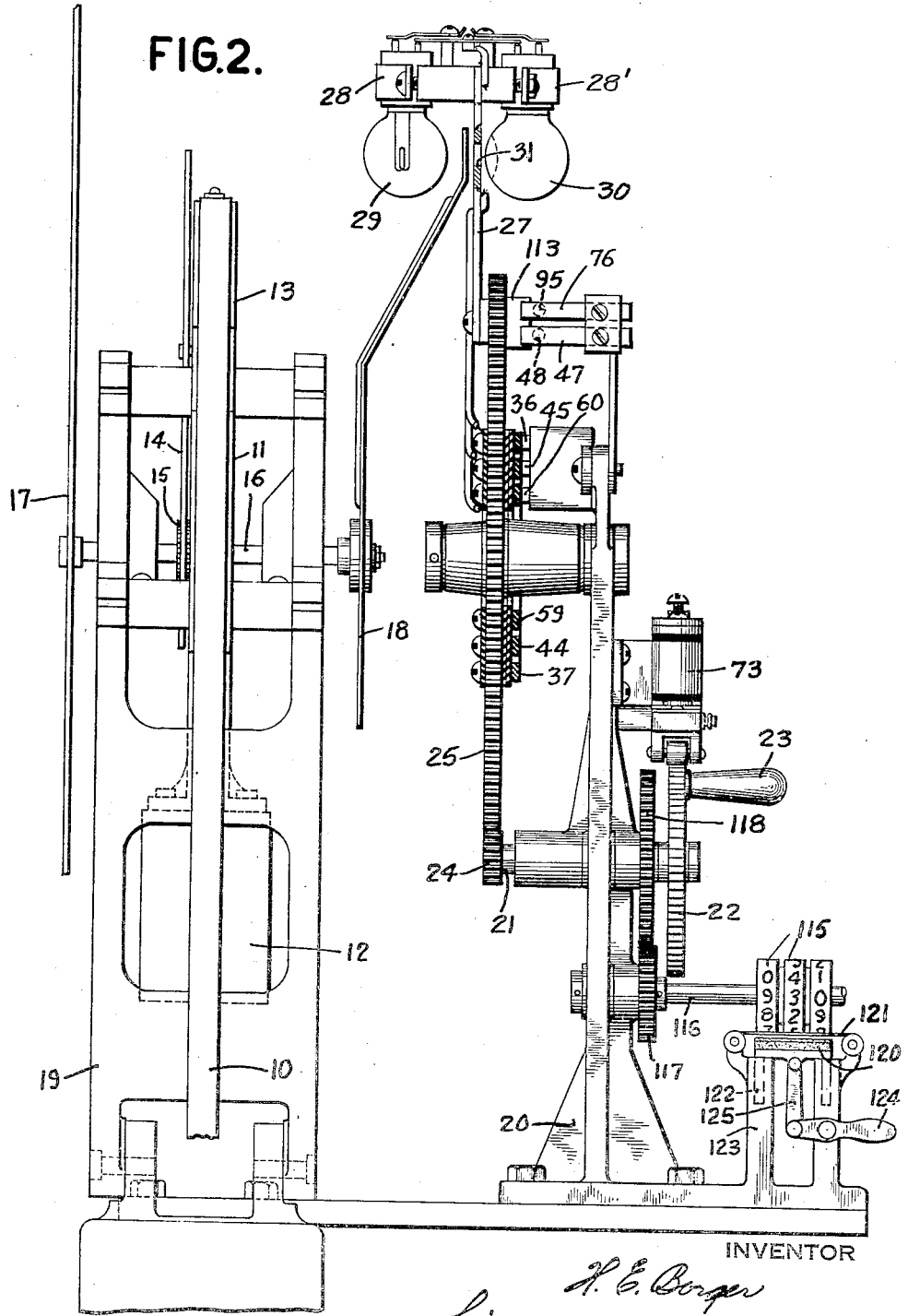
Fig. 2 is a side view of the upper part of the scale as provided with the sensing and recording devices.

The movement of the sensing device to a position corresponding to the pointer is used to operate a series of indicating wheels 115. These wheels are on a shaft 116 having a gear 117 meshed with a gear 118 on shaft 21. Thus as the shaft 21 is operated by handle 23, the wheels 115 are operated, any suitable transfer mechanism being provided between the wheels. After the ratchet wheel 22 is latched by armature 73, the wheels 115 will indicate the load on the scale. To furnish a printed record of the load, a platen 120 (Fig. 2) may be provided to support a sheet of paper opposite the wheels 115, and below an ink ribbon 121. The platen has legs 122 slidable in posts 123 carried by standard 20. One of the posts 123 has pivoted thereto a hand lever 124 pivoted to a link 125 connected to the platen. Thus, depression of lever 124 will through link 125 raise the platen and effect printing thereon of the load on the scale.

After a recording operation, the operator opens push button contacts 80 thereby deenergizing magnet 73 and unlocking wheel 22. The parts may now be returned to home position.

Brushes 36, 45, 60 and contact blades 47 and 76 are carried by the standard 20. Slip rings 37, 44, and 59 are secured to the spokes 26 of wheel 25, their terminals 38, 43 and 58 being nearest the arm 27 carrying lamp 29 and cell 30 so that leads 39, 43 and 58 may be made as short as possible.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In combination, a load responsive mechanism, a light wave-reactive device controlled by said mechanism, auxiliary mechanism, means operated by the device for controlling said auxiliary mechanism according to the load, and means for automatically delaying control of said auxiliary mechanism by said first-mentioned means until the load-responsive mechanism is at rest under a load.

2. In a scale, register mechanism, a source of light wave emanations, a photo cell device reactive to said wave emanations, an actuator for moving the register mechanism and the photo cell device proportionally to each other, load weighing means for varying the flow of emanations to said device when the latter has reached a position corresponding to the load, and means controlled by said device when the flow of emanations to the latter is varied for automatically acting on the actuator to limit operation thereby of the register mechanism in accordance with the operation of the weighing means.

3. In a scale, number registering elements, an actuator therefor, a source of radiant energy, a photo cell device reactive to said energy, weighing means for controlling the energization of said cell by said source, and means controlled by said device for stopping operation of the registering elements by the actuator as soon as the numerical representation of the load stands on the registering wheels.

4. In combination; load weighing mechanism including a control element movable in proportion to the load to a load position, a follow-up control element movable to sense the first element at the load position, a device for positively arresting movement of the follow-up element, and electrical means controlled by coaction of said elements when the second element senses the first element for operating said device to positively arrest movement of the follow-up element in the position in which it sensed the first element and to retain it in such position subsequent to the sensing operation.

5. In combination; load weighing mechanism including a control element movable in proportion to the load to a load position, auxiliary mechanism, a second control element, actuating means for synchronously moving the auxiliary mechanism and the second control element to cause the latter to sense the first control element at the load position, means for positively arresting movement of the auxiliary mechanism, and electrical means controlled by coaction of said elements when the second element senses the first element for rendering the arresting means effective to arrest the auxiliary mechanism in the position it reached when the second element sensed the first element and retain it in the latter position subsequent to the sensing operation.

6. In combination; load weighing mechanism, auxiliary mechanism, means for moving the auxiliary mechanism in accordance with movement of the weighing mechanism under a load, a notched member connected to the auxiliary mechanism to move correspondingly with movement of the latter, a pawl for entering a notch of said member to positively arrest the movement of the notched member and of the auxiliary mechanism, and an electrical intercontrol between the weighing and auxiliary mechanisms to move the pawl into arresting engagement with the notched disk when the auxiliary mechanism has been moved by said means to an extent corresponding to movement of the weighing mechanism.

7. In combination, weighing mechanism including a load responsive element, a control device including a source of light waves and a cell controlled by light waves emanating from said source, driving means for moving the device to a position where the load responsive element is interposed between the light wave source and the cell to thereby block the reception by the cell of light waves from said source, auxiliary mechanism movable by said driving means to a position indicative of the load, means controlled by said cell upon interruption of the light waves by said load responsive element to lock the auxiliary mechanism in load indicative position, and means operated by the driving means for disabling the wave source when the driving means is in home position corresponding to zero position of the load responsive element.

HENRY E. BORGER.